United States Patent [19]
Cato

[11] Patent Number: 5,822,714
[45] Date of Patent: Oct. 13, 1998

[54] DATA PROCESSING SYSTEM AND METHOD FOR ACCESSING A PLURALITY OF RADIO FREQUENCY IDENTIFICATION TAGS

[75] Inventor: Robert Thomas Cato, Raleigh, N.C.

[73] Assignee: International Business Machines Corporation, Armonk, N.Y.

[21] Appl. No.: 812,565

[22] Filed: Mar. 5, 1997

[51] Int. Cl.$^6$ .................................................. G01S 13/75
[52] U.S. Cl. .................. 702/108; 340/572; 340/825.54; 342/42; 342/44
[58] Field of Search ................................. 364/551.01, 517; 340/825.39–825.54, 572, 517, 568, 825.34; 342/42, 44, 51; 702/108; 235/435, 487

[56] References Cited

U.S. PATENT DOCUMENTS

| | | | |
|---|---|---|---|
| 5,124,699 | 6/1992 | Tervoert et al. | 340/825.54 |
| 5,407,050 | 4/1995 | Takemoto et al. | 340/825.35 |
| 5,489,908 | 2/1996 | Orthmann et al. | 342/42 |
| 5,537,094 | 7/1996 | Bettine et al. | 340/572 |
| 5,537,126 | 7/1996 | Kayser et al. | 345/1 |
| 5,550,547 | 8/1996 | Chan et al. | 342/42 |
| 5,574,665 | 11/1996 | Narasimhan | 364/517 |
| 5,635,693 | 6/1997 | Benson et al. | 253/384 |
| 5,673,037 | 9/1997 | Cesar et al. | 340/572 |
| 5,682,143 | 10/1997 | Brady et al. | 340/572 |

*Primary Examiner*—John E. Barlow, Jr.
*Assistant Examiner*—Bryan Bui
*Attorney, Agent, or Firm*—John D. Flynn; Winstead, Sechrest & Minick

[57] ABSTRACT

A data processing system and method are implemented for determining when a portion of RFID tags in a read volume cannot be fully accessed by a RFID tag reader. In the data processing system, multiple known RFID tags are placed around a perimeter of a three-dimensional read volume. A RFID tag reader interrogates each of the RFID tags to determine whether all the perimeter RFID tags can be accessed before the reader attempts to access the contents of the read volume. If the reader is unable to interrogate all of the perimeter RFID tags, then it is likely that a blockage of radio frequency signals within the read volume exists. Therefore, an RFID tag within the read volume cannot be accessed because the RF signals are unable to reach the RFID tag due to blockage. In this situation, a system operator would be alerted that an RFID reader is unable to accurately access a number of RFID tags within the read volume. The system operator would also be alerted as to a location of the blockage within the read volume. The system operator may then take appropriate action to rectify the RF signal blockage.

26 Claims, 3 Drawing Sheets

5,822,714

DATA PROCESSING SYSTEM AND METHOD FOR ACCESSING A PLURALITY OF RADIO FREQUENCY IDENTIFICATION TAGS

TECHNICAL FIELD

The present invention relates in general to a radio frequency identification tag, and more particularly to a data processing system for accessing a plurality of radio frequency identification tags in a read volume.

BACKGROUND INFORMATION

Radio frequency identification (RFID) technology uses electromagnetic energy as a medium through which to send information. Typically, RFID tags are devices which are affixed to various articles so that these articles may be easily tracked during movement from one point to another or identified through a sales transaction. Therefore, one may tag objects such as assets, animals, and people so that they may be identified or tracked automatically via a reader which is frequently connected to a host computer that may contain additional data related to an object's identification number which is associated with the RFID tag. Furthermore, the RFID tag generally contains programmed information about an object to which it is attached. Through the use of such information, RFID technology may be used to identify objects automatically and without manual handling operations as is required in most bar code systems.

In a typical RFID tag system, a receiver and some type of transmitter, an antenna, and memory are implemented. Through the use of these components, RFID tags are enabled to receive, store, and transmit article-identifying data with a remote data base station. RFID tags have been implemented using a variety of methodologies to allow a user to perform any number of desired identification functions. For example, RFID tags may be read-only or read-write. Additionally, passive RFID tags may be implemented without batteries and draw their power from the radio frequency (RF) energy transmitted from the reader. As well, RFID tags may be low or high frequency depending on a user's desires.

While many different implementations for RFID tags exist, a common thread among each of these implementations is that a reader or interrogator must be able to access each of the RFID tags in a group of such tags so that information may be obtained and processed in a useful manner. Difficulties arise when multiple objects having RFID tags are placed in a container, or read volume. In such cases, there is a concern that some items may be unreadable due to surrounding items and obstructions between the objects and the reader. When some items are unreadable, the RFID tag system in which it is implemented fails to provide precise or accurate readings of a number of objects within that read volume.

To compensate for such inaccuracies, prior art systems have had to merely access one item at a time to insure absolute accuracy. In some situations, prior art systems have attempted to ensure accuracy by requiring that a number of RFID tags in a read volume be known so that an operator could determine if all RFID tags had been accessed correctly. In either case, these prior art implementations are costly in terms of time and resource requirements for large volumes of items.

Therefore, a need exists for an RFID tag interrogator or reader which is able to determine when the interrogator's ability to read RFID tags in a read volume has been impaired and, thus, to indicate when the accuracy of a read operation performed by the interrogator is susceptible to error.

SUMMARY OF THE INVENTION

The previously mentioned needs are fulfilled with the present invention. Accordingly, there is provided, in a first form, a radio frequency identification tag system. The radio frequency identification tag system includes a stand that includes a plurality of radio frequency identification tags. This stand is capable of supporting a plurality of objects, wherein each of the plurality of objects includes an object identification tag.

Additionally, there is provided, in a second form, a method for operating a radio frequency identification tag system. The method includes a step of accessing a first plurality of identification numbers using an interrogator. The first plurality of identification numbers corresponds to a plurality of perimeter radio frequency identification tags configured about a read volume. The method also includes the step of accessing a second plurality of identification numbers using the interrogator. The second plurality of identification numbers corresponds to the plurality of perimeter radio frequency identification tags configured about the read volume. Subsequently, the second plurality of identification numbers is compared with the first plurality of identification numbers to identify a blockage which prevents the interrogator from accessing each of a plurality of objects stored in the read volume.

Furthermore, there is provided, in a third form, a radio frequency identification tag system. The radio frequency identification tag system include a plurality of perimeter radio frequency identification tags configured about a read volume and an interrogator. The interrogator accesses a first plurality of identification numbers corresponding to the plurality of perimeter radio frequency identification tags and accesses a second plurality of identification numbers corresponding to the plurality of perimeter radio frequency identification tags. The radio frequency identification tag system also includes a base station for comparing the second plurality of identification numbers and the first plurality of identification numbers to identify a blockage which prevents the interrogator from accessing each of a plurality of objects stored in the read volume.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
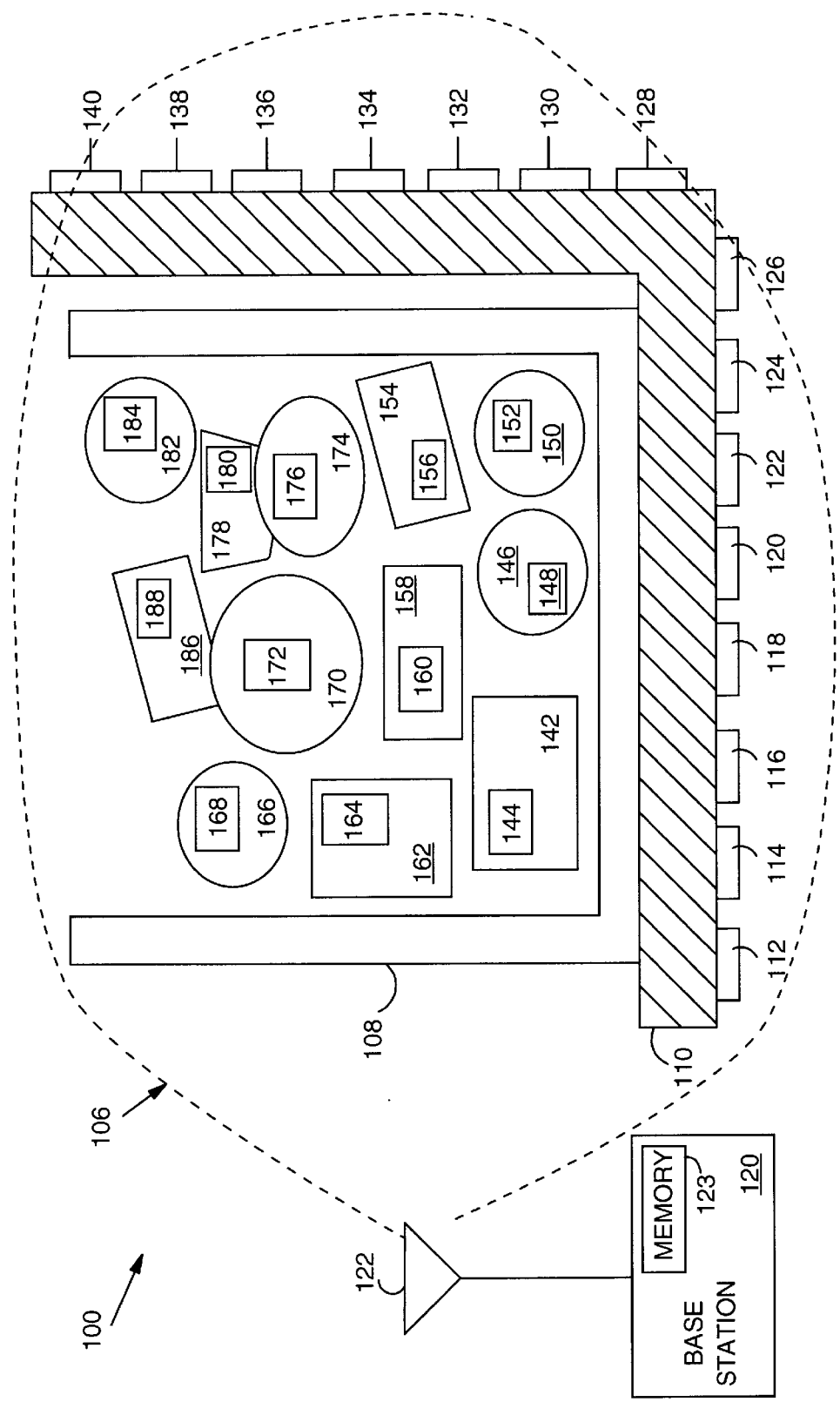
FIG. 1 illustrates, in block diagram form, an RFID tag identification system in accordance with one embodiment of the present invention.

The present invention provides a data processing system and method for determining when a portion of RFID tags in a read volume cannot be fully accessed by a RFID tag reader.

The data processing system of the present invention then provides that information to a user to allow the user to modify the position of the RFID tag reader or the configuration of the objects in the read volume to increase the accuracy of a read operation.

To implement the methodology and data processing system of one embodiment of the present invention, multiple known RFID tags are placed around a perimeter of a three-dimensional read volume, or container. A RFID tag reader interrogates each of these RFID tags to determine whether all of them can be read before the RFID tag reader attempts to read RFID tags within the read volume. If the RFID tag reader is unable to interrogate all of the perimeter RFID tags, then it is likely that a blockage of radio frequency (RF) signals within the read volume exists and therefore, a RFID tag within the read volume may be missed during a read operation because the RF signals are unable to reach the RFID tag due to blockage. When the RFID tag reader is unable to interrogate all of the perimeter tags, a system operator is alerted that a RFID reader may not correctly read a number of RFID tags within the read volume. The operator may then take appropriate actions to rectify the RF signal blockage. As the blockage of a RF signal from an RFID reader is likely to result from the characteristics of the items to which the RFID tags are attached and the manner in which the items are grouped together within the read volume, an operator can utilize the information provided by the RFID reader to redistribute the items or to remove some of the items from the read volume. Subsequently, the RFID tag reader can be enabled and the procedure repeated until all perimeter tags can be read by the RFID tag reader.

Furthermore, since the perimeter RFID tags are placed around the read volume, information about a blocked perimeter RFID tag may also be used to indicate an area in which RF signal blockage occurs and where the items in a read volume should be redistributed or removed. By using the methodology described above, the number of RFID tags which are not correctly accessed by an RFID reader is drastically reduced and a user is able to more accurately read a number of RFID tags in a read volume. A following description of one embodiment of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. A connectivity associated with each of FIGS. 1 and 2 will subsequently be provided.

Connectivity of the Invention

FIG. 1 illustrates an RFID tag identification system 100 which comprises a container 108, a stand 110, a RFID base station 120 having a memory 123, and a base station antenna 122. Stand 110 comprises a plurality of RFID tags 112–140 placed around a perimeter of stand 110. Within container 108, a plurality of unknown items 142, 146, 150, 154, 158, 162, 166, 170, 174, 178, 182, and 186 are placed. Each of the plurality of items contained within container 108 comprises one of a plurality of unknown RFID tags 144, 148, 152, 156, 160, 164, 168, 172, 176, 180, 184, and 188.

Figure 2:
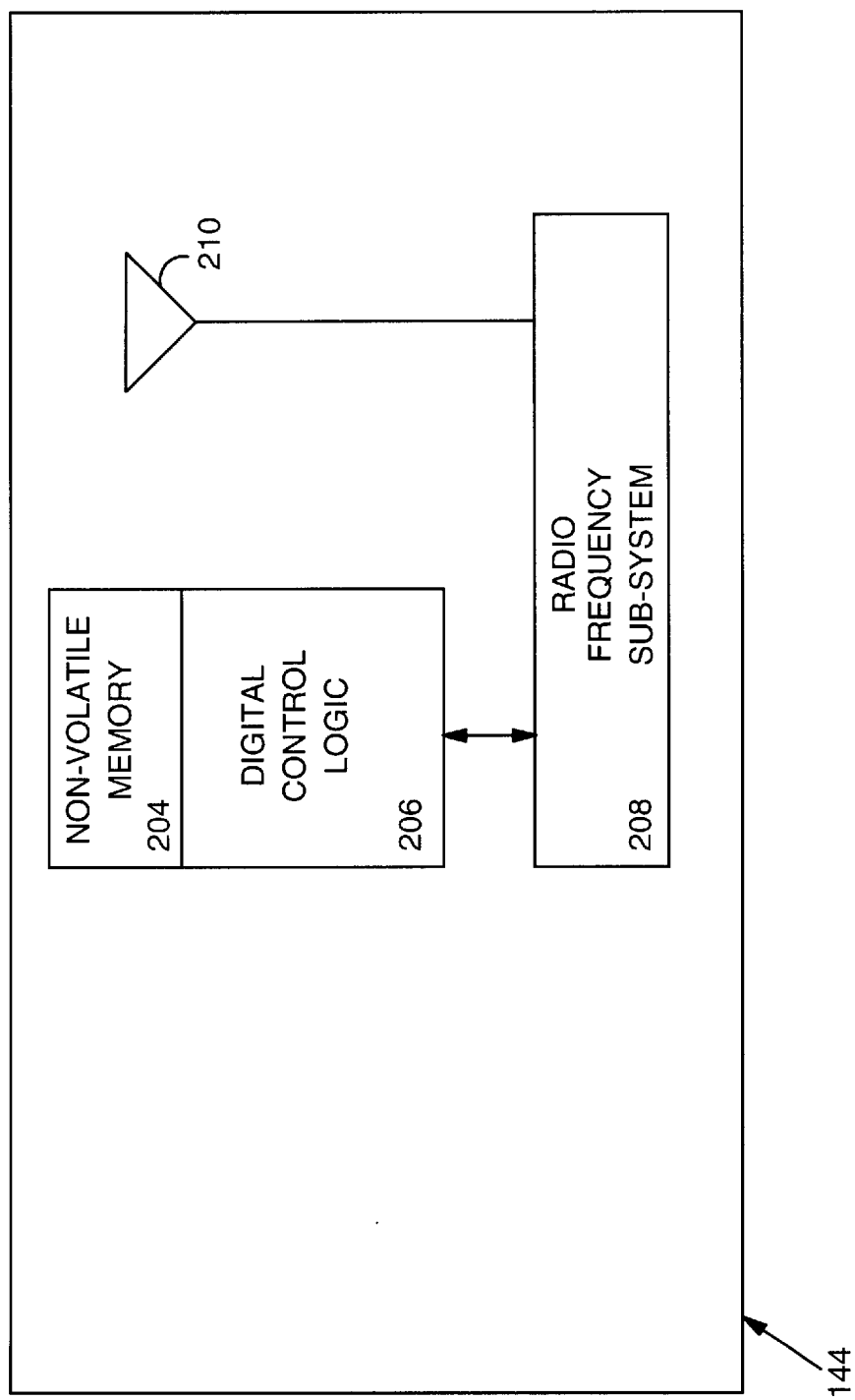
FIG. 2 illustrates, in block diagram form, an RFID tag of FIG. 1.

FIG. 2 illustrates RFID tag 144 in greater detail. It should be noted that RFID tag 144 is representative of a plurality of RFID tags 112–140, 144, 148, 152, 156, 160, 164, 168, 172, 176, 180, 184, and 188. RFID tag 144 comprises a digital control circuit 206, a non-volatile memory 204, a radio frequency sub-system 208, and an antenna 210. Radio frequency identification (RFID) base station 120 communicates information with RFID tag 104 via an antenna 122.

Description of Operation

The system illustrated in FIGS. 1 and 2 implements one embodiment of the present invention which provides a data processing system and method for determining when a portion of RFID tags in a read volume cannot be fully accessed by a RFID tag reader. A description of operation of the data processing system and method of the present invention will subsequently be described. It should be noted that dashed line 106 represents a maximum RFID read zone in which RFID tag reader 102 is able to read any enabled RFID tags. Therefore, base station 120 may interrogate each of the plurality of RFID tags 112–140 to access an identification number stored therein if the objects stored within container 108 are not manufactured of certain materials through which RF waves do not easily pass and if the objects are not positioned such that they block a RF field within read volume 106. The present invention is provided to detect such blockages when known, readable RFID tags (112–140) located around a perimeter of the read volume (106) cannot be read when a container of unknown items is within the read volume.

During installation of tag identification system 100 of the present invention, a system designer must first configure the plurality of RFID tags 112–140 around the perimeter of read volume 106 or at locations on an opposite side of container 108 than base station antenna 122. In practice, the plurality of RFID tags 112–140 could be placed around a perimeter of stand 110.

Spacing and the position of each of the plurality of RFID tags 112–140 is determined by a system developer to ensure that there is a sufficient number of RFID tags in desired positions to detect radio frequency blockage due to the items which are placed in container 108 on stand 110. After each of the plurality of perimeter RFID tags 112–140 is affixed to stand 110, a system developer indicates the position of each of the plurality of perimeter RFID tags 112–140 to base station 120. The use of this positional information will subsequently be described.

During the initialization operation, RFID base station 120 accesses and determines the identity of each of a plurality of perimeter RFID tags when no non-perimeter RFID tags are contained within the read volume (106). Interrogation to access an identification number may be performed using techniques which are well-known in the relevant industry and, therefore, will not be described in greater detail herein. When the identification numbers of the perimeter RFID tags 112–140 are retrieved by base station 120, base station 120 stores each of the plurality of accessed identification numbers internally in memory 123. After base station 120 has interrogated each of the plurality of perimeter RFID tags 112–140 and stored each of the plurality of corresponding identification numbers in its own internal memory 123, base station 120 is enabled to perform a read operation on a volume of unknown items.

Before each attempt to access a volume of unknown items with RFID tags, base station 120 accesses each of the plurality of perimeter RFID tags 112–140. RFID base station 120 may provide a group command to one, several, or all of the tags in a group to be enabled for identification. By using this method, undesired tags are not enabled and, therefore, are prevented from responding and an amount of power consumed by such tags and the batteries required to provide that power are not consumed. Because base station 120 has stored identification numbers corresponding to each of the plurality of perimeter RFID tags 112–140 in its internal memory 123, base station 120 may perform a "roll call" operation in this read step. Stated another way, base station 120 must merely compare the identification numbers interrogated from each of the plurality of perimeter RPID tags 112–140 with the contents of memory 123 to determine whether each of the plurality of perimeter RFID tags 112–140 has been read. The read operation performed by RFID base station 120 on the plurality of perimeter RFID tags 112–140 is efficiently implemented and does not have the timing latency associated with search algorithms typically required during a RFID tag system's interrogation operation of multiple unknown RFID tags.

After each of the plurality of perimeter RFID tags 112–140 has been interrogated, base station 120 determines whether any blockage or radio frequency shadows exist in the read volume. If base station 120 indicates that any of the plurality of perimeter RFID tags 112–140 was not correctly read, base station 120 provides an external indicator to a system operator to indicate that all of the perimeter RFID tags 112–140 could not be accessed. Additionally, base station 120 also indicates a position of the perimeter RFID tags which could not be accessed by base station 120. In this situation, the operator then reconfigures a relevant portion of the items stored within container 108 to alleviate such blockage. The steps described above for accessing each of the plurality of perimeter RFID tags 112–140 can then be repeated until no blockage or shadows exist within the read volume. Subsequently, the unknown RFID tags are accessed.

After each of the plurality of perimeter RFID tags 112–140 is accessed, base station 120 disables each of the plurality of perimeter RFID tags 112–140 such that they are unable to participate in a subsequent access operation performed for unknown RFID tags associated with the items stored within container 108. It should be noted that each of the plurality of perimeter RFID tags 112–140 is not required to be disabled, but disabling each of this plurality of RFID tags reduces the complexity associated with reading, or accessing, each of the plurality of items stored within container 108.

After each of the plurality of perimeter RFID tags 112–140 has been disabled, base station 120 interrogates the plurality of RFID tags corresponding to each of the plurality of unknown items 142, 146, 150, 154, 158, 162, 166, 170, 74, 178, 182, and 186 to obtain accurate information about the aforementioned items.

Refer now to FIG. 2 which illustrates a typical RFID tag 144. It should be noted that RFID tag 144 is representative of RFID tags 112–140, 148, 152, 156, 160, 164, 168, 172, 176, 180, 184 and 188. During execution of the operations described above, RFID base station 120 transmits a radio frequency command to antenna 210 to enable operation of RFID tag 144 via antenna 122. The information transferred to antenna 210 is provided to radio frequency sub-system 208.

RFID tag radio sub-systems, such as sub-system 208, vary greatly. Radio sub-systems may use frequency modulation, phase shift modulation, and amplitude modulation techniques (AM) which are well-known in the relevant art. For example, an efficient AM modulation technique allows the tag to modify the termination of the tag's antenna from a matched impedance to a mismatched impedance while RFID base station emits a constant amplitude carrier. This modification technique is performed by connecting a transistor to the leads of the tags antenna (not illustrated in detail herein). The transistor is then turned on and off to effectively modulate an amount of the RFID base station's carrier that is reflected off of the tag's antenna. The modulated signal is then picked up by the RFID base station. This method is particularly efficient in that it does not require the RFID tag to actually transmit any radio frequency (RF) power. Additionally, a simple AM receiver for a tag can be implemented by simply using a diode to demodulate the AM signal. The use of a diode to demodulate an AM signal is well-known to those with skill in the relevant art.

Once RFID tag 144 is enabled to provide information, a signal source, such as base station 120, sends a signal to antenna 210 of RFID tag 144. It should be noted that the signal source may be a pulsed light source, an RF source, or any source typically used for performing RFID functions. Radio frequency sub-system 208 receives this signal information from RFID base station 120 via antenna 210 and passes this information to digital control logic 206. Digital control logic 206 then controls the radio frequency sub-system 208 in a manner which is dependent on the signals provided above and on information received from the RFID base station. Similarly, radio frequency sub-system 208 transmits the information back to RFID base station 120 via antenna 210.

Figure 3:
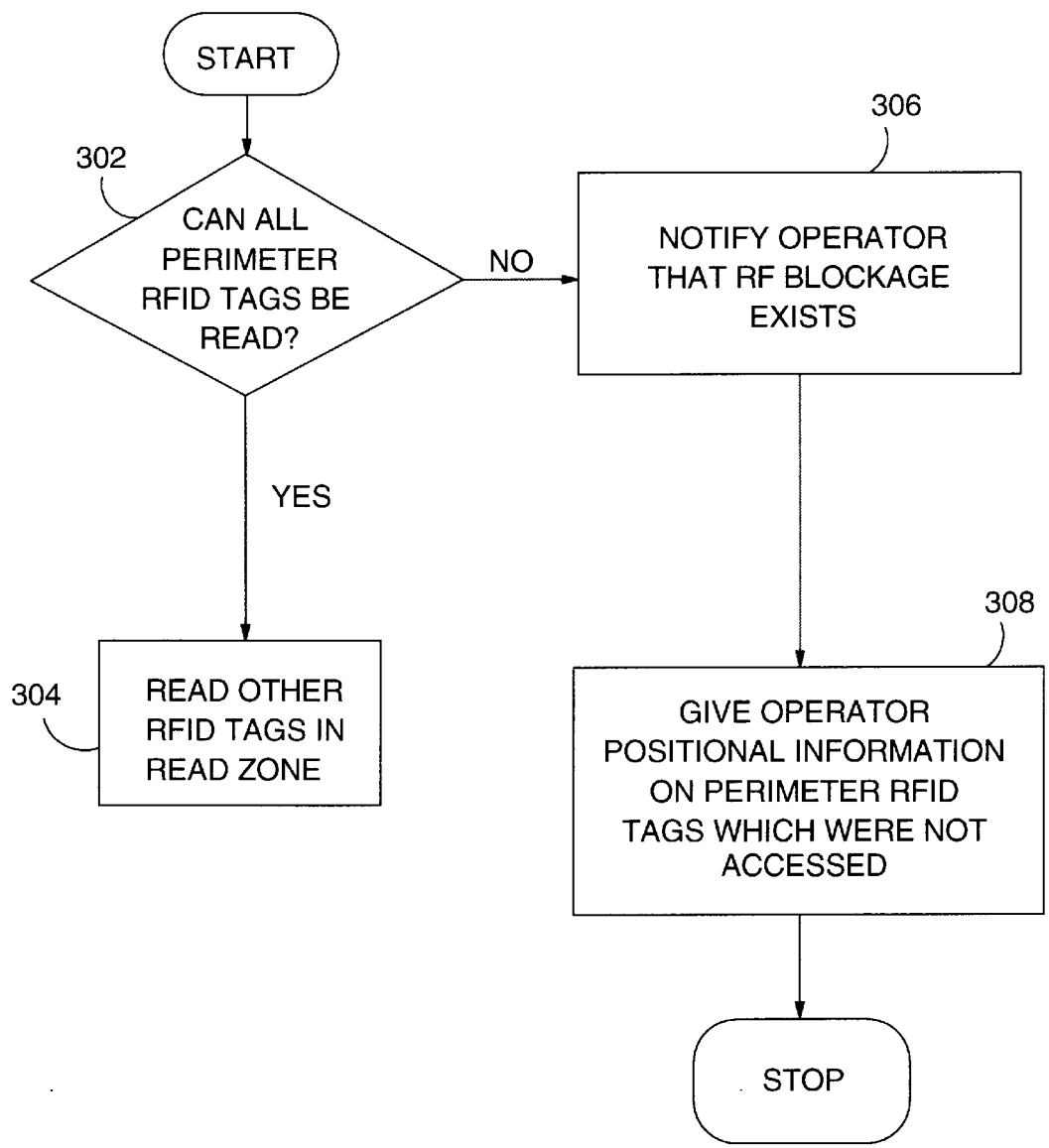
FIG. 3 illustrates, in flow diagram form, a method for executing an RFID tag identification function in accordance with one embodiment of the present invention.

A summary of operation of the present invention is provided in a flow chart of FIG. 3. During operation of the present invention, in a first step, RFID base station 120 is used to determine whether all perimeter RFID tags may be read. RFID base station 120 performs this function by providing a signal to interrogate each of the plurality of perimeter RFID tags 112–140. As previously mentioned, each of the plurality of perimeter RFID tags 112–140 has an identification number known to base station 120. If base station 120 receives identification numbers from each of the plurality of perimeter RFID tags 112–140, base station 120 commences to read each of the other plurality of unknown RFID tags within the read zone identified by dashed line 106. However, should base station 120 be unable to read all of the perimeter RFID tags, base station 120 notifies an operator that a radio frequency blockage exists (step 306), and provides positional information about a location of RF blockage (step 308).

By utilizing the methodology of the present invention, a user is able to more accurately read and identify RFID tags attached to items within a read volume. Therefore, the inaccuracies and inadequacies of prior art RFID tag identification systems are avoided to a great extent by the methodology implemented by the present invention.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A radio frequency identification tag system, comprising:

a stand comprising a plurality of radio frequency identification tags, said radio frequency identification tags configured around a perimeter of a read volume, the stand being capable of supporting a plurality of objects, wherein each of the plurality of objects comprises an object identification tag.

2. The radio frequency identification tag system of claim 1 wherein the object identification tag is a radio frequency identification tag.

3. The radio frequency identification tag system of claim 1, further comprising:

a base station for accessing each of the plurality of radio frequency identification tags when each of the plurality of radio frequency identification tags is within a maximum read zone.

4. The radio frequency identification tag system of claim 3 wherein the base station accesses a first plurality of identification numbers from each of the plurality of radio frequency identification tags during an initial read operation.

5. The radio frequency identification tag system of claim 4 wherein the base station, comprises:

a memory for storing the plurality of identification numbers.

6. The radio frequency identification tag system of claim 4 wherein the base station accesses a second plurality of identification numbers from each of the plurality of radio frequency identification tags and compares the second plurality of identification numbers with the first plurality of identification numbers.

7. The radio frequency identification tag system of claim 6 wherein the base station indicates that a blockage exists when the second plurality of identification numbers is different than the first plurality of identification numbers.

8. The radio frequency identification tag system of claim 6 wherein the base station accesses the second plurality of identification numbers when the plurality of objects are placed within a read volume of the stand.

9. The radio frequency identification tag system of claim 8, wherein the plurality of radio frequency identification tags are physically mounted in a plurality of locations on the stand, wherein the initial read operation is performed by the base station previous to the plurality of objects being placed within the read volume of the stand, wherein the second plurality of identification numbers are accessed by the base station after the plurality of objects have been placed within the read volume of the stand, wherein the base station indicates that a blockage exists when the second plurality of identification numbers is different than the first plurality of identification numbers.

10. A method for operating a radio frequency identification tag system, comprising the steps of:

accessing a first plurality of identification numbers using an interrogator, the first plurality of identification numbers corresponding to a plurality of perimeter radio frequency identification tags configured around a read volume;

accessing a second plurality of identification numbers using the interrogator, the second plurality of identification numbers corresponding to the plurality of perimeter radio frequency identification tags configured around the read volume; and comparing the second plurality of identification numbers and the first plurality of identification numbers to identify a blockage which prevents the interrogator from accessing each of a plurality of objects stored in the read volume.

11. The method of claim 10, further comprising the step of:

affixing the plurality of perimeter radio frequency identification tags to a stand.

12. The method of claim 11, wherein the step of affixing the plurality of perimeter radio frequency identification tags to the stand is performed before the step of accessing the first plurality of identification numbers, wherein the method further comprises the steps of:

placing a plurality of objects in the read volume, wherein each of the plurality of objects comprises an object radio frequency identification tag, before executing the step of accessing the second plurality of identification numbers using the interrogator; and providing an indicator to an external user that a blockage exists when the second plurality of identification numbers differs from the first plurality of identification numbers.

13. The method of claim 10, further comprising the step of:

placing a plurality of objects in the read volume, wherein each of the plurality of objects comprises an object radio frequency identification tag, before executing a step of accessing the second plurality of identification numbers using the interrogator.

14. The method of claim 13, further comprising the step of:

accessing a third plurality of identification numbers corresponding to the plurality of objects in the read volume when the second plurality of identification numbers corresponds to the first plurality of identification numbers.

15. The method of claim 13, further comprising the step of:

providing an indicator to an external user that a blockage exists when the second plurality of identification numbers differs from the first plurality of identification numbers.

16. The method of claim 13, further comprising the step of:

disabling each of the plurality of perimeter radio frequency identification tags when the second plurality of identification numbers corresponds to the first plurality of identification numbers.

17. The method of claim 16, further comprising the step of:

accessing a third plurality of identification numbers corresponding to the plurality of objects in the read volume.

18. The method of claim 13, further comprising the step of:

indicating a location of a blockage when the second plurality of identification numbers differs from the first plurality of identification numbers.

19. A radio frequency identification tag system, comprising:

a plurality of perimeter radio frequency identification tags configured around a read volume;

an interrogator for accessing a first plurality of identification numbers corresponding to the plurality of perimeter radio frequency identification tags and for accessing a second plurality of identification numbers corresponding to the plurality of perimeter radio frequency identification tags; and a base station for comparing the second plurality of identification numbers and the first plurality of identification numbers to identify a blockage which prevents the interrogator from accessing each of a plurality of objects stored in the read volume.

20. The radio frequency identification tag system of claim 19, further comprising:

a stand, wherein each of the plurality of perimeter radio frequency identification tags is configured about a perimeter of the stand.

21. The radio frequency identification tag system of claim 20, wherein the interrogator accesses the second plurality of identification numbers after the plurality of objects are placed in the read volume, wherein the base station indicates to an external user that a blockage exists when the second plurality of identification numbers differs from the first plurality of identification numbers.

22. The radio frequency identification tag system of claim 19 wherein the base station accesses the first plurality of identification numbers from each of the plurality of radio frequency identification tags during an initialization operation.

23. The radio frequency identification tag system of claim 19 wherein the base station indicates that a blockage exists when the second plurality of identification numbers is different than the first plurality of identification numbers.

24. The radio frequency identification tag system of claim 19 wherein the base station indicates a location of blockage when the second plurality of identification numbers is different than the first plurality of identification numbers.

25. The radio frequency identification tag system of claim 19 wherein the base station disables each of the plurality of radio frequency identification tags when the second plurality of identification numbers corresponds to the first plurality of identification numbers.

26. The radio frequency identification tag system of claim 19 wherein a plurality of objects are stored within the read volume before the interrogator accesses the second plurality of identification numbers.

* * * * *